US009405594B2

(12) United States Patent
Ryu et al.

(10) Patent No.: US 9,405,594 B2
(45) Date of Patent: Aug. 2, 2016

(54) METHOD AND APPARATUS FOR CONTROLLING ACCESS TO RESOURCES IN REMOTE USER INTERFACE SERVICE

(75) Inventors: Young-Sun Ryu, Seongnam-si (KR); Kook-Heui Lee, Suwoon-si (KR); Jae-Yeon Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1613 days.

(21) Appl. No.: 12/611,541

(22) Filed: Nov. 3, 2009

(65) Prior Publication Data

US 2010/0115027 A1    May 6, 2010

(30) Foreign Application Priority Data

Nov. 3, 2008  (KR) .................. 10-2008-0108527

(51) Int. Cl.
| | | |
|---|---|---|
| G06F 15/16 | (2006.01) | |
| G06F 9/52 | (2006.01) | |
| H04L 29/08 | (2006.01) | |
| H04L 29/06 | (2006.01) | |

(52) U.S. Cl.
CPC ............... *G06F 9/52* (2013.01); *H04L 67/025* (2013.01); *H04L 67/36* (2013.01); *H04L 63/10* (2013.01)

(58) Field of Classification Search
CPC ................................ G06F 9/526; H04L 63/10

USPC .......... 709/203, 205, 220, 217–219; 718/103; 707/8, 10
See application file for complete search history.

(56) References Cited

U.S. PATENT DOCUMENTS

| | | | |
|---|---|---|---|
| 6,173,316 B1 | 1/2001 | De Boor et al. | |
| 6,233,543 B1 | 5/2001 | Butts et al. | |
| 6,263,360 B1* | 7/2001 | Arnold et al. ................. | 709/203 |
| 2002/0120607 A1* | 8/2002 | Price et al. ....................... | 707/1 |
| 2006/0282836 A1* | 12/2006 | Barker .......................... | 718/103 |
| 2007/0204347 A1 | 8/2007 | Caceres et al. | |
| 2008/0126929 A1 | 5/2008 | Bykov | |
| 2012/0137075 A1* | 5/2012 | Vorbach .................. | G06F 9/526 711/122 |
| 2015/0106542 A1* | 4/2015 | Horikawa ............... | G06F 9/524 710/200 |

FOREIGN PATENT DOCUMENTS

KR    1020010085233    9/2001

* cited by examiner

*Primary Examiner* — Hitesh Patel
(74) *Attorney, Agent, or Firm* — The Farrell Law Firm, P.C.

(57) ABSTRACT

A method is provided for controlling access to a resource of a Remote User Interface (RUI) server in an RUI client of an RUI system. The method includes sending a request for an RUI page for controlling the resource to the RUI server and receiving the RUI page, generating a connection to a Mutual Exclusion (MUTEX) of the RUI server, which corresponds to the resource, using the received RUT page, and sending a request for MUTEX locking for restricting access to the resource to the RUI server.

19 Claims, 6 Drawing Sheets

METHOD AND APPARATUS FOR CONTROLLING ACCESS TO RESOURCES IN REMOTE USER INTERFACE SERVICE

PRIORITY

This application claims priority under 35 U.S.C. §119(a) to a Korean Patent Application filed in the Korean Intellectual Property Office on Nov. 3, 2008 and assigned Serial No. 10-2008-0108627, and a Korean Patent Application filed in the Korean Intellectual. Property Office on Sep. 30, 2009 and assigned Serial No. 10-2009-0093532, the contents of both of which are incorporated herein by reference.

BACKGROUND OF THE INVENTION

1. Field of the Invention

The present invention relates generally to Remote User Interfaces (RUIs), and more particularly, to a method and apparatus for controlling access to resources of an RUI server in an RUI service in which an RUI server provides RUIs and RUI clients control remote devices using the RUIs.

2. Description of the Related Art

Extensive research to improve home network technology is being conducted by many industrial standard organizations such as Digital Living Network Alliance (DLNA), Home Audio-Video interoperability (HAVi), and Universal Plug and Play (UPnP). In such home networks, an RUI technology may be used in order to enable one device to control functions of other devices. In the RUI technology that is based on client-server architecture, an RUI client fetches a User Interface (UI) from an RUI server and allows a user to control the RUI server through the UI in the RUI client.

Consumer Electronics Association (CEA)-2014, a standard for RUI, defines a protocol and a framework for RUI in a UPnP network and the Internet. According to CEA-2014, a UPnP device (or RUI server) provides user interfaces in a Consumer Electronics-Hypertext Markup Language (CE-HTML) type of web page, and a user may remotely control applications of the UPnP device through the web page. CE-HTML, a special version of HTML, is based on eXtensible Hyper Text Markup Language (XHTML).

Figure 1:
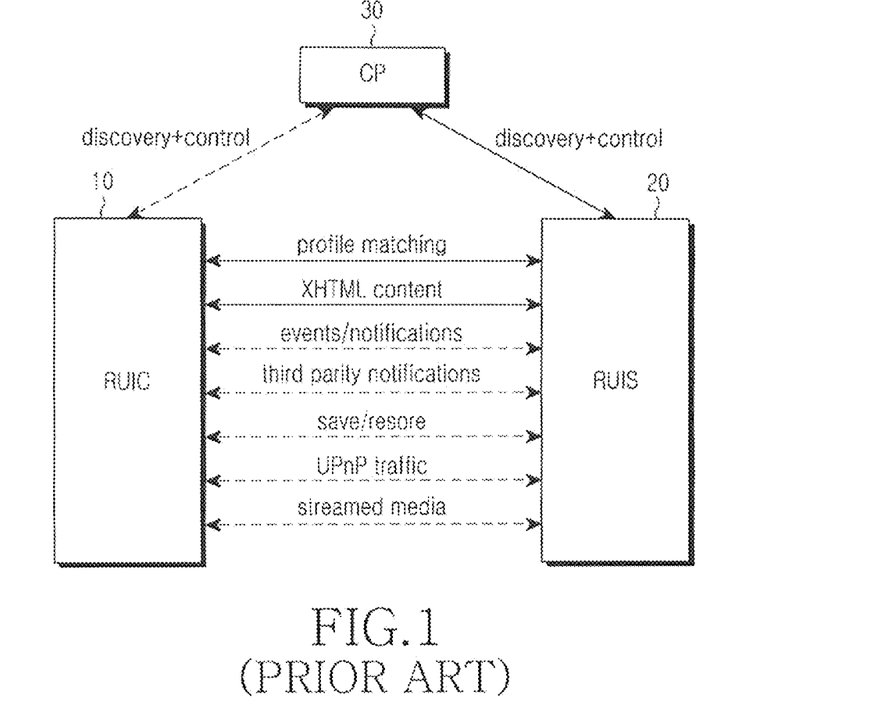
FIG. 1 illustrates a conventional process of providing an RUI page.

FIG. 1 illustrates a method in which an RUI server and an RUI client communicate based on the CEA-2014 standard. Discovering an RUI server 20 should be performed first in order to use RUIs in a home network. CEA-2014 discovers the RUI server 20 through a UPnP discovery process since it is based on a UPnP network. Although an RUE client 10 and a Control Point (CP) 30 are separately shown in FIG. 1, if the UPnP CP 30 is embedded in the RUI client 10, the RUI client 10 may directly discover the RUI server 20. If the RUI client 10 has no CP 30 and a separate CP 30 intends to send a UI of the RUI server 20 to the RUI client 10, the CP 30 may discover even the RUI client 10 through UPnP discovery.

After the discovery process is completed, the RUI client 10 acquires an RUI page referring to a Uniform Resource Locator (URL) where the RUI page exists, which is included in a UPnP Device Description. More specifically, an XHTML browser of the RUI client 10 sends a request for an RUI page to a web server in the RUI server 20. Since the RUI page is composed so as to control applications of the RUI server 20, the RUI client 10 controls the applications of the RUI server 20 using the RUI page. The method in which the RUI server 20 and the RUI client 10 communicate according to the prior art is disclosed in detail in the CEA-2104 standard, so a description thereof is omitted herein for the sake of conciseness.

In this manner, the conventional RUI service is based on the general Web server—HTML browser architecture. The general Web server merely returns the page requested by the browser, without managing access to specific resources. As such, the Web server cannot manage access by clients, since it has no information as to whether a certain browser is terminated after it has requested a page.

However, when the Web server controls a function of the RUI server 20 using provided information, i.e., an RUI page, rather than simply providing the information to clients as in CEA-2014, the Web server needs to control access to resources by the RUI client 10. This is necessary because device collision can occur when a user controls a device, and other users can control the same device.

For example, in some instances when one client is using resources such as a tuner control or a phone line, there is a need to prevent other clients from accessing the same resources or application resources.

Figure 2:
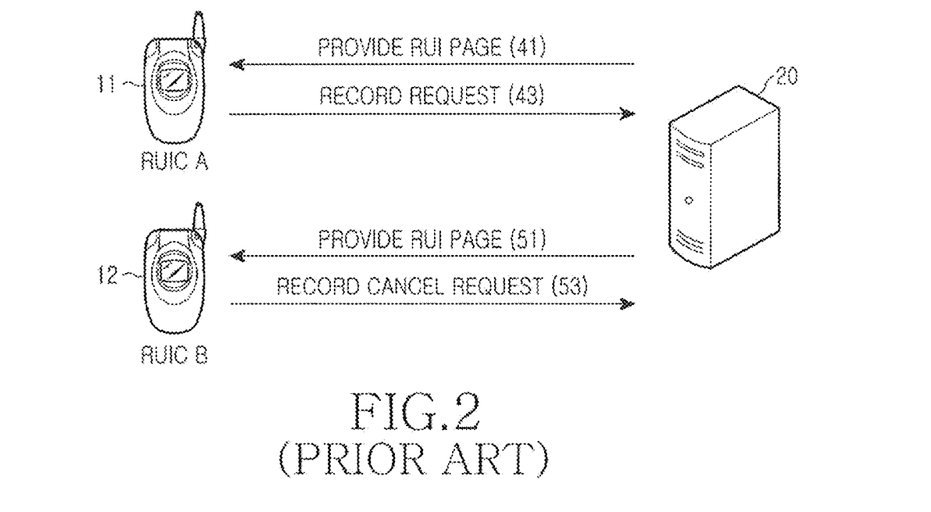
FIG. 2 illustrates a conventional process of using resources.

As another example, as shown in FIG. 2 if an RUI client A 11 acquires an RUI page from an RUI server 20 in step 41 and then sends a record request for a broadcast program received over a particular channel in step 43, the RUI server 20 records the broadcast program. Meanwhile, an RUI client B 12 may acquire the RUI page from the RUI server 20 in step 51, and then send a record cancel request for the broadcast program to the RUI server 20 through the acquired RUI page in step 53. However, collision may occur if the RUI client A 11 wants to keep, the recording.

When a connection or session between the RUI client 10 and the RUI server 20 is managed to solve these and other problems in FIG. 1, a database for managing connections of individual users is separately provided in the Web server (not shown). Alternatively, the RUI client 10 may use a separate plug-in program such as well-known active X for each individual application since Consumer Electronics (CE) devices generally use an embedded plug-in program and various Operation Systems (OSs) and their resources are insufficient, however, the embedded plug-in program may not be freely installed.

SUMMARY OF THE INVENTION

An aspect of the present invention is to address at least the above-mentioned problems and/or disadvantages and to provide at least the advantages described below. Accordingly, an aspect of the present invention provides a method and apparatus for controlling attempts that several RUI clients make to use specific resources of an RUI server.

Another aspect of the present invention provides a resource access control method and apparatus for providing an RUI to an RUI client that attempts to use the access-restricted resources.

According to the present invention, there is provided a method for controlling access to a resource of an RUE server in an RUE client of an RUI system. The method includes sending a request for an RUI page for controlling the resource to the RUI server and receiving the RUI page, generating a connection to a MUTual EXclusion (MUTEX) of the RUI server, which corresponds to the resource, using the received RUI page, and sending a request for MUTEX locking for restricting access to the resource to the RUI server.

According to the present invention, there is provided a method for controlling access to a resource of an RUI server in the RUI server of an RUI system. The method includes transmitting an RUI page for controlling the resource to an RUI client upon request from the RUI client, and receiving a request for a MUTEX locking for restricting access to the resource from the RUI client that generates a connection to a MUTEX corresponding to the resource.

According to the present invention, there is provided an RUI client apparatus for controlling access to a resource of an RUI server in an RUI system. The RUI client apparatus includes a Web browser module for sending a request for an RUI page to the RUI server and receiving the RUI page, and a MUTEX handler for sending to the RUI server a request for restricting access to a resource selected in the RUI page by another RUI client, to request access to the selected resource, wherein the Web browser module provides an RUI page capable of controlling the selected resource to a user, upon receiving an access approval to the selected resource from the RUI server.

According to the present invention, there is provided an RUI server apparatus for controlling access to a resource in an RUI system. The RUI server apparatus includes a plurality of MUTEXs corresponding to respective resources that correspond to respective control rights associated with applications provided by the RUI server apparatus, and a Web server for transmitting an RUI page to an RUI client upon request of the RUI client, receiving an access request to a selected resource by receiving from the RUI client a request for restricting access to the resource selected in the RUI page by another RUI client, and sending an access approval to the selected resource to the RUI client if a MUTEX corresponding to the selected resource does not indicate an access restricted status.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EMBODIMENTS

The terms and words used in the following description and claims are not limited to the bibliographical meanings, but are merely used by the inventor to enable a clear and consistent understanding of the invention. Accordingly, it should be apparent to those skilled in the art that the following description of the embodiments of the present invention are provided for illustration purpose only and not for the purpose of limiting the invention as defined by the appended claims and their equivalents.

In an RUI service to which the present invention is applied, an RUI server provides RUIs and RUI clients control remote devices through the provided RUIs. The present invention provides a method and apparatus for controlling and managing access to resources of an RUI server in the RUI service.

Accordingly, the present invention provides a MUTEX that indicates the current occupation status by an RUI client, regarding each of all resources of an RUI server, which can be accessed by the RUI client. When an arbitrary RUI client intends to use a particular resource of an RUI server, the RUI client accesses MUTEX corresponding to the particular resource to check an occupation status by another RUI client, instead of directly accessing the resource. Whether the arbitrary RUI client is approved to access the particular resource is determined based on the check results. Assuming that an associated MUTEX indicates an access restricted status as the particular resource is already occupied by another RUI client, the arbitrary RUI client can access the particular resource, if access to the particular resource ends within a predetermined response wait time, or if access to the particular resource is released upon an access restriction release request from the arbitrary RUI client.

Figure 3:
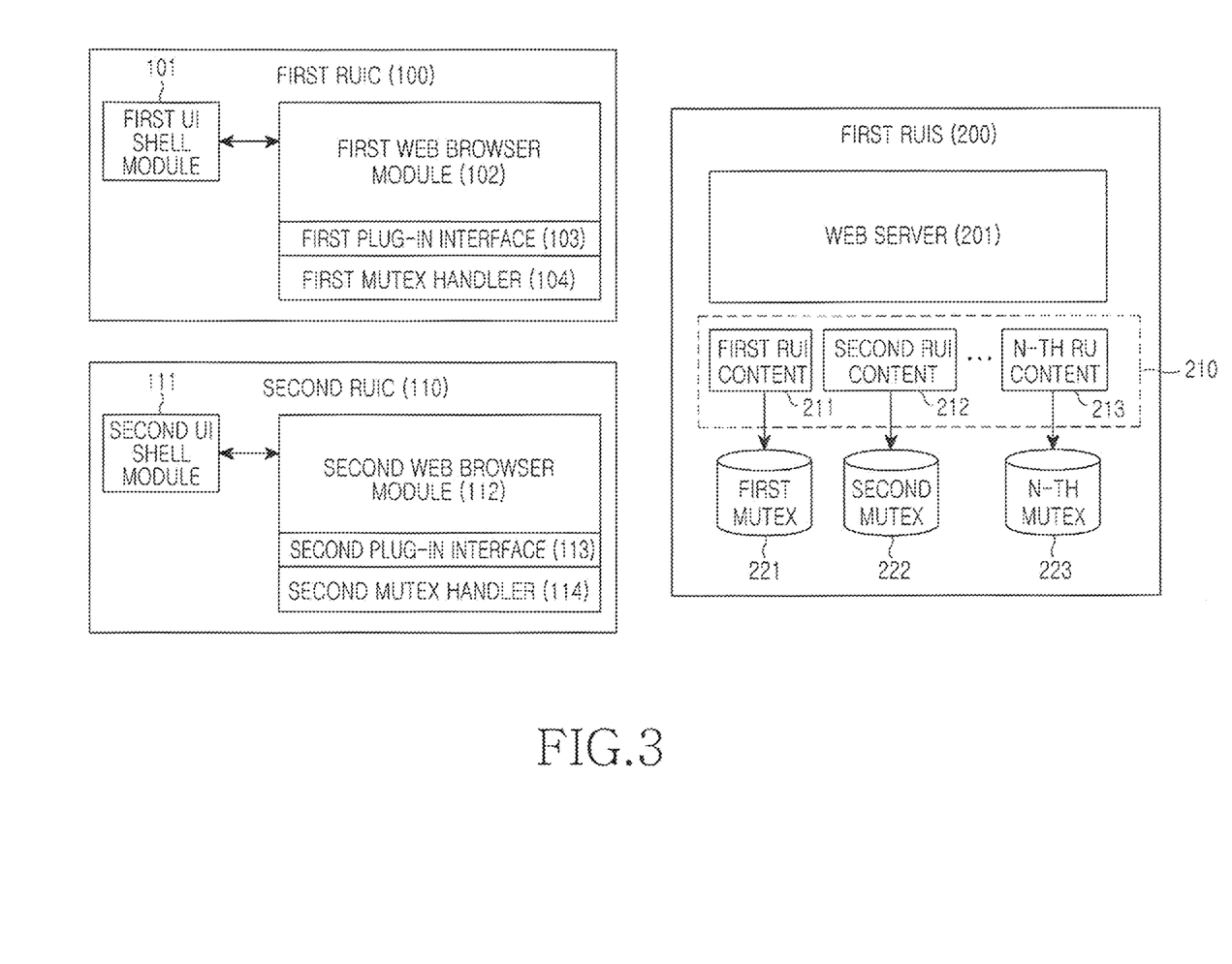
FIG. 3 illustrates architecture of an RUI system according to the present invention.

FIG. 3 illustrates architecture of an RUI system according to the present invention. Referring to FIG. 3, the RUI system includes one or more RUI clients 100 and 110, and one or more RUI servers 200.

In accordance with the present invention, the first RUI server 200 provides RUIs to RUI clients, and includes a Web server 201, a content storage 210 for storing a plurality of RUI contents 211, 212 and 213, and a plurality of MUTEXs 221, 222 and 223 that correspond to the RUI contents 211, 212 and 213 on a one-to-one basis.

The Web server 201 is a software module for providing an RUI page, which is composed of eXtensible Hyper Text Markup Language (XHTML) contents. The XHTML contents each include a plug-in object for managing a right to control applications of the first RUI server 200. Thus, a Web browser module of an RUI client can analyze the plug-in object, and does not need to show it to the user because the plug-in object is for managing the control right.

Further, the Web server 201 manages setting of statuses of the MUTEXs 221, 222 and 223, such as access-restricted status or access restriction released status for each resource.

The content storage 210 stores to present URIs one or more RUI contents 211, 212 and 213, which are composed of XHTML, image and script, for example. Each of the RUI contents 211, 212 and 213 indicates a resource corresponding to each of the control rights associated with applications provided by the first RUI server 200.

According to the present invention, one MUTEX (221, 222 and 223) exists per one RUI content (211, 212 and 213), or one resource. The MUTEXs 221, 222 and 223 indicate the current occupation statuses for the corresponding resources by an RUI clientand are distinguishable by a Uniform Resource Locator (URL), which may be included in an RUI page and then delivered to the RUI client.

Therefore, when an arbitrary RUI client intends to access a particular resource, the arbitrary RUI client accesses MUTEX corresponding to the particular resource and determines whether the particular resource is occupied by another RUI client. The access to MUTEX is achieved by a named resource method. If the particular resource is already occupied by another RUI client, its MUTEX holds an access restricted status, and if the particular resource is not occupied by any RUI client, the MUTEX indicates an access restriction released status. The arbitrary RUI client can acquire access to the particular resource when MUTEX of the particular resource indicates an access restriction released status. The access-restricted status for the resource is expressed as MUTEX Locking, while the access restriction released status for the resource is expressed as MUTEX Unlocking.

Hence, when several RUI clients simultaneously attempt access to one resource, they may use the resource after acquiring access to the MUTEX.

The first RUI client 100 and the second RUI client 110 are constructed in a similar manner. Thus, only a first UI shell module 101, a first Web browser module 102, a first plug-in interface 103, and a first MUTEX handler 104 in the first RUI client 100 will be described. However, the similar function and operation may be applied to a second UI shell module 111, a second Web browser module 112, a second plug-in interface 113, and a second MUTEX handler 114 in the second RUI client 110.

The first RUI client 100 includes the first UI shell module 101, the first Web browser module 102, the first plug-in interface 103, and the first MUTEX handler 104.

The first Web browser module 102 is a software module for rendering and presenting an RUI page that is composed in XHTML. Further, the first Web browser module 102 controls a process of making a request for an RUI page in response to a user input and sending a control command corresponding to an arbitrary resource selected in the RUI page to an RUI server.

The first UI shell module 101 displays a list of searched UIs available in the network and receives user inputs.

The first MUTEX handler 104 is a plug-in object for controlling access to MUTEXs in the first RUI server 200. In the present invention, the first MUTEX handler 104 may be driven as an object tag in CE-HTML, and one MUTEX handler may manage controlling access to several MUTEXs.

Figure 4:
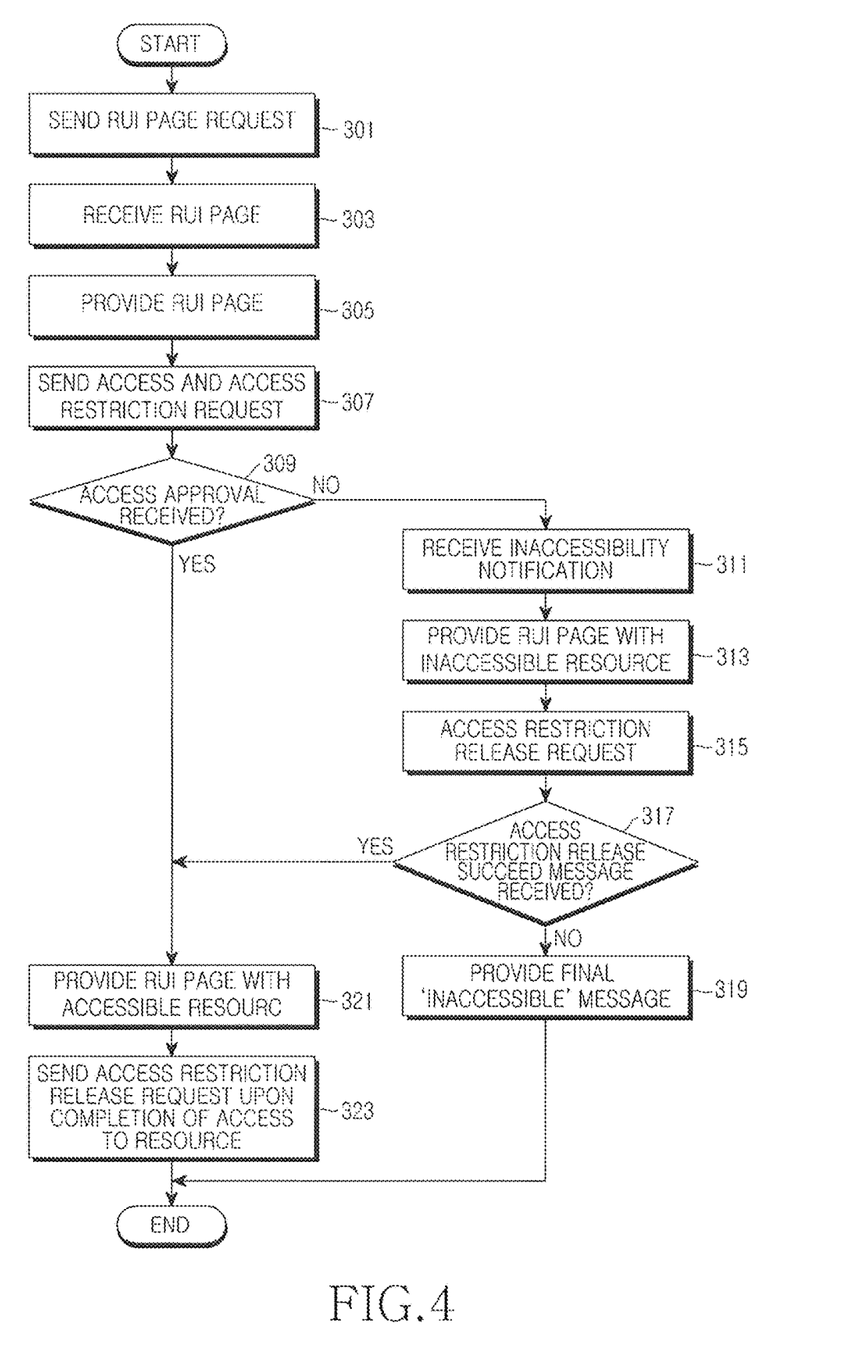
FIG. 4 illustrates an operation process of an RUI client according to the present invention.
Figure 5:
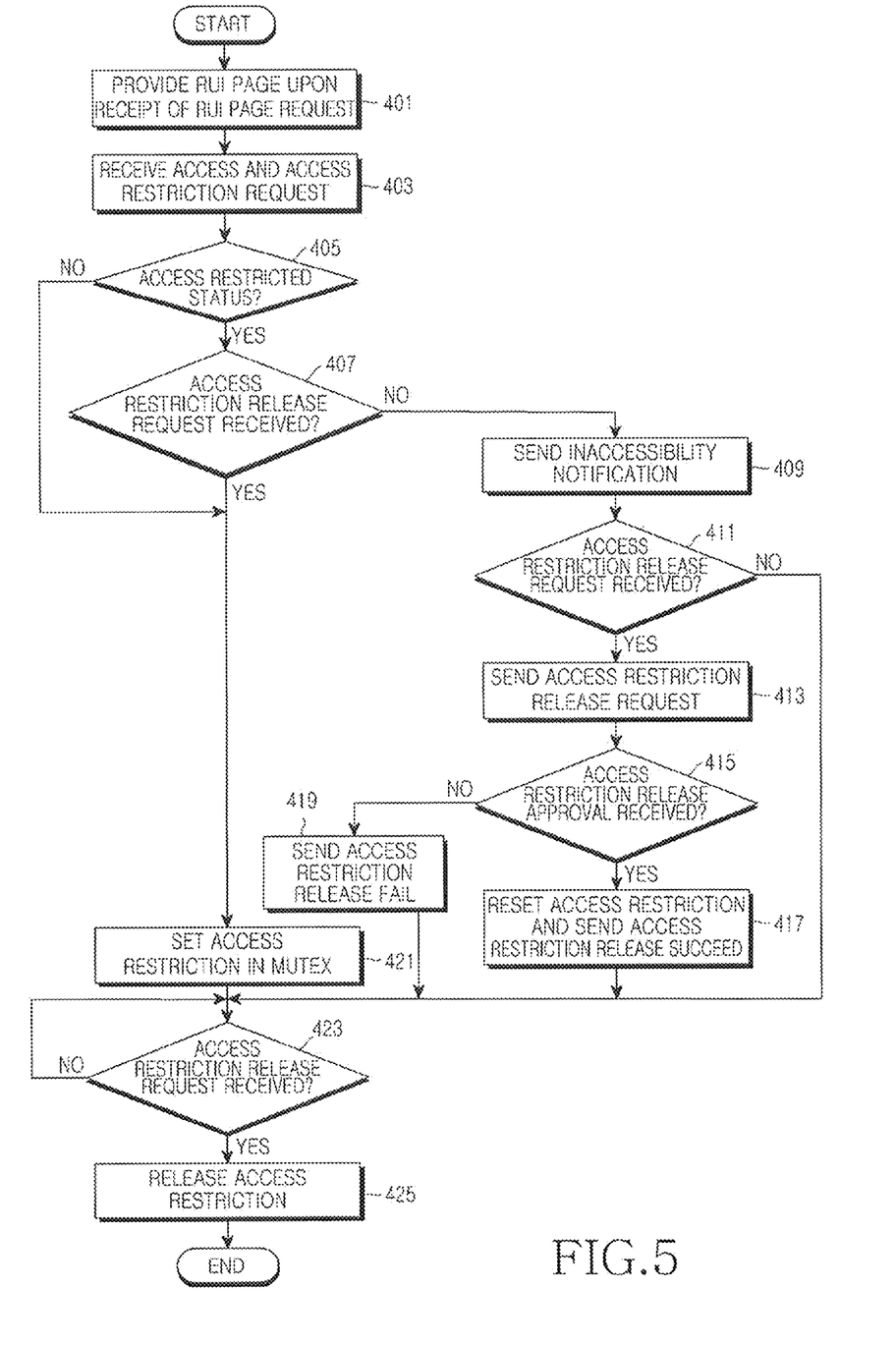
FIG. 5 illustrates an operation process of an RUI server according to the present invention.

An operation process of an RUI client in the RUI system according to an embodiment of the present invention is illustrated in FIG. 4, and an operation process of an RUI server is illustrated in FIG. 5. While the operation process being applied to the first RUI client 100 will be described in FIGS. 4 and 5, the same operation process may be applied even to the second RUI client 110.

A user of the first RUI client 100 designates the first RUI server 200 as a device the user desires to remotely control, and sends a request for an RUI page to the first RUI server 200 using the first UI shell module 101 in the first RUI client 100. Referring to FIG. 4, the first RUI client 100 sends a request for an RUI page to the first RUI server 200 in step 301.

As the first RUI client 100 requests an RUI page, the first RUI server 200 receives the RUI page request and transmits an RUI page composed by the Web server 201 to the first RUI client 100 in step 401 in FIG. 5.

The first RUI client 100 receives the RUI page in step 303, and provides the received RUI page to the user through the first Web browser module 102 and the first UI shell module 101 in step 305.

If the first RUI client 100 attempts access to a resource of the first RUI server 200 in step 305, the first MUTEX handler 104 sends a request for access or access restriction to the resource to the first RUI server 200 in step 307. The access restriction request is made by the first RUI client 100 to exclusively use the resource. To achieve the access restriction request, the first MUTEX handler 104 accesses a MUTEX of the RUI server 200 that corresponds to the resource, and requests a change in status of the MUTEX to an access restricted status. The access request to the resource may also be achieved by delivering a request for changing a status of the MUTEX to an access restricted status.

The first RUI server 200 receives the access or access restriction request to a particular resource in step 403, and determines in step 405 whether the particular resource is in an access restricted status. In other words, the first RUI server 200 determines whether status of MUTEX corresponding to the particular resource is an access restricted status. If the MUTEX does not indicate the access restricted status as the particular resource is not occupied by any RUI client, the Web server 201 proceeds to step 421 where it sets 'access restriction' in the MUTEX of the particular resource and informs the first RUI client 100 of accessibility.

In step 309, the first RUI client 100 determines whether an access approval is received within a response wait time. If the access approval is received, the first Web browser module 102 may provide an RUI page capable of accessing the particular resource to the user in step 321.

If the MUTEX of the particular resource indicates the access restricted status in step 405, the Web server 201 in the first RUI server 200 determines in step 407 whether an access restriction release request is received within a response wait time from an RUI client that presently occupies the resource. If the 20 access restriction release request is received, the Web server 201 releases the access restriction by the RUI client occupying the resource, sets 'access restriction' to the particular resource in response to the request of the first RUI client 100, and informs the first RUI client 100 of accessibility to the resource, in step 421.

The corresponding operation of the first RUI client 100 corresponds to steps 309 and 321.

If the access restriction release request is not received in step 407 within the response wait time from the RUI client that occupies the resource, the Web server 201 sends an inaccessibility notification to the first RUI client 100 in step 409, and the first RUI client 100 receives the inaccessibility notification in step 311. It is noted that step 311 can be omitted.

Upon receipt of the inaccessibility notification, the first RUI client 100 provides an RUI page with an inaccessible resource to the user in step 313.

Thereafter, the first MUTEX handler 104 in the first RUI client 100 sends an access restriction release request for the particular resource to the first RUI server 200 according to a user selected input or automatically in step 315.

Upon receipt of the access restriction release request in step 411, the first RUI server 200 sends an access restriction release request for the particular resource to the RUI client that presently occupies the particular resource in step 413. Upon receipt of a response approving release of access restriction to the particular resource in step 415, the first RUI server 200 resets 'access restriction' to the particular resource as 'access restriction' by the first RUI client 100, and sends a success in releasing access restriction to the first RUI client IOU in step 417.

Upon receipt of the success in releasing access restriction in step 317, the first RUI client 100 provides an RUI page with an accessible resource to the user in step 321.

If the first RUI server 200 receives in step 415 a response denying release of access restriction to the particular resource From the RUI client that presently occupies the particular resource, the Web server 201 sends a fail in releasing access restriction to the first RUI client 100 in step 419.

In this case, the first RUI client 100 receives the release failure for access restriction in step 317, and receives a final 'inaccessible' message in step 319, and then ends the operation process.

After step 321, if the access to the particular resource ends, the first RUI client 100 sends an access restriction release request to the first RUI server 200 in step 323. The first RUI server 200 receives the access restriction release request in step 423, and changes MUTEX corresponding to the particular resource to an access restriction released status in step 425.

A control ownership plug-in object used according to the RUI system in the present invention is defined in Table 1 below.

TABLE 1

| Property | |
| --- | --- |
| Number MutexStatus | Status information of current MUTEX |
| String Content URL | URL string specifying RUI page to be loaded |
| function onMutexLock( ) | Callback function invoked when MutexLock( ) is completed |
| function onReleaseRequest( ) | Callback function invoked when a locking release request for Mutex locked for access restriction occurs |
| Method | |
| MutexOpen(MutexURL) | Generate connection to Mutex resource described in MutexURL |
| MutexLock(Number TimeoutMS, Boolean ReleaseRequested) | Request Mutex locking to restrict access to a resource corresponding to Mutex. The request waits for a time described in timeoutMS |
| MutexUnlock( ) | Attempt Mutex unlocking |
| MutexTryLock( ) | Determine whether Mutex locking is possible. It is equal to MutexLock( ) but status of Mutex is unchanged |
| MutexClose( ) | Release connection to Mutex |

Figure 6:
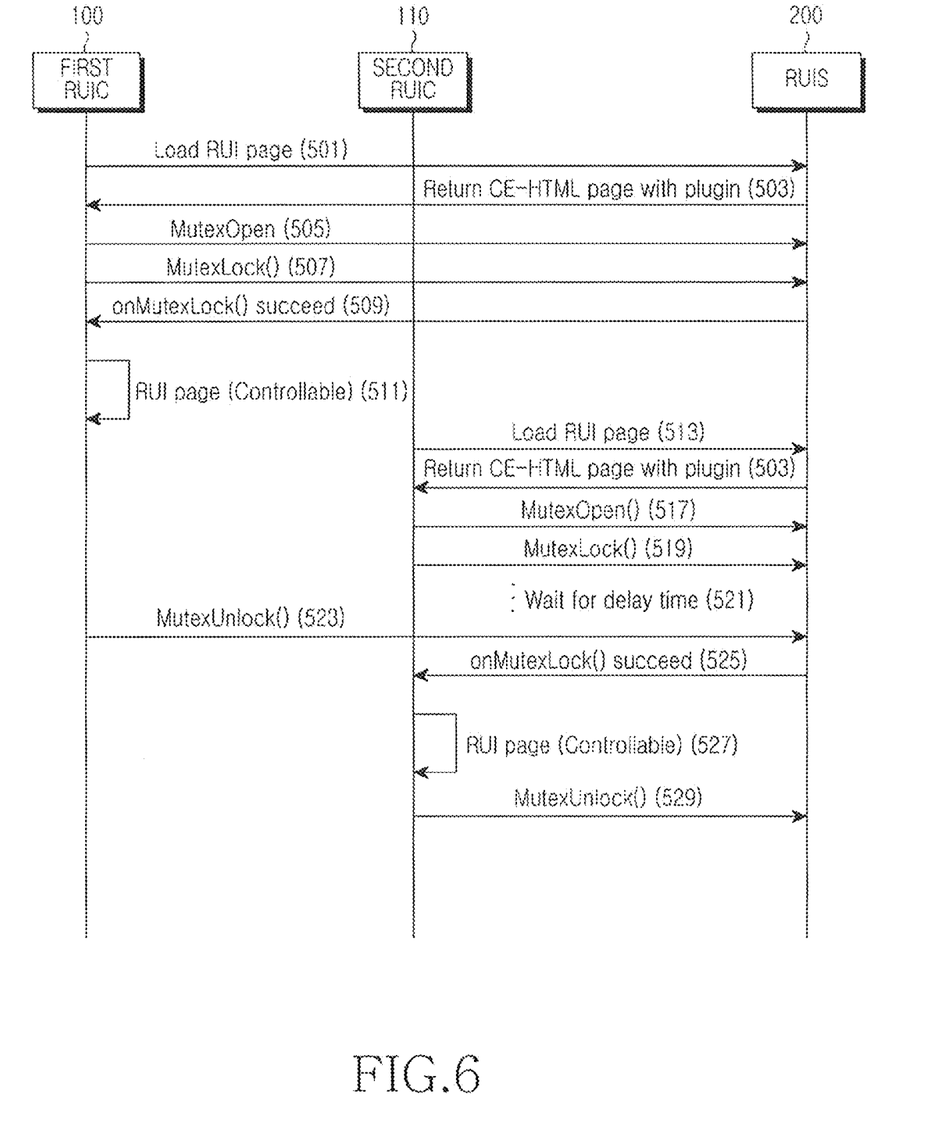
FIG. 6 illustrates an operation process of an RUI server and an RUI client according to a first embodiment of the present invention.
Figure 7:
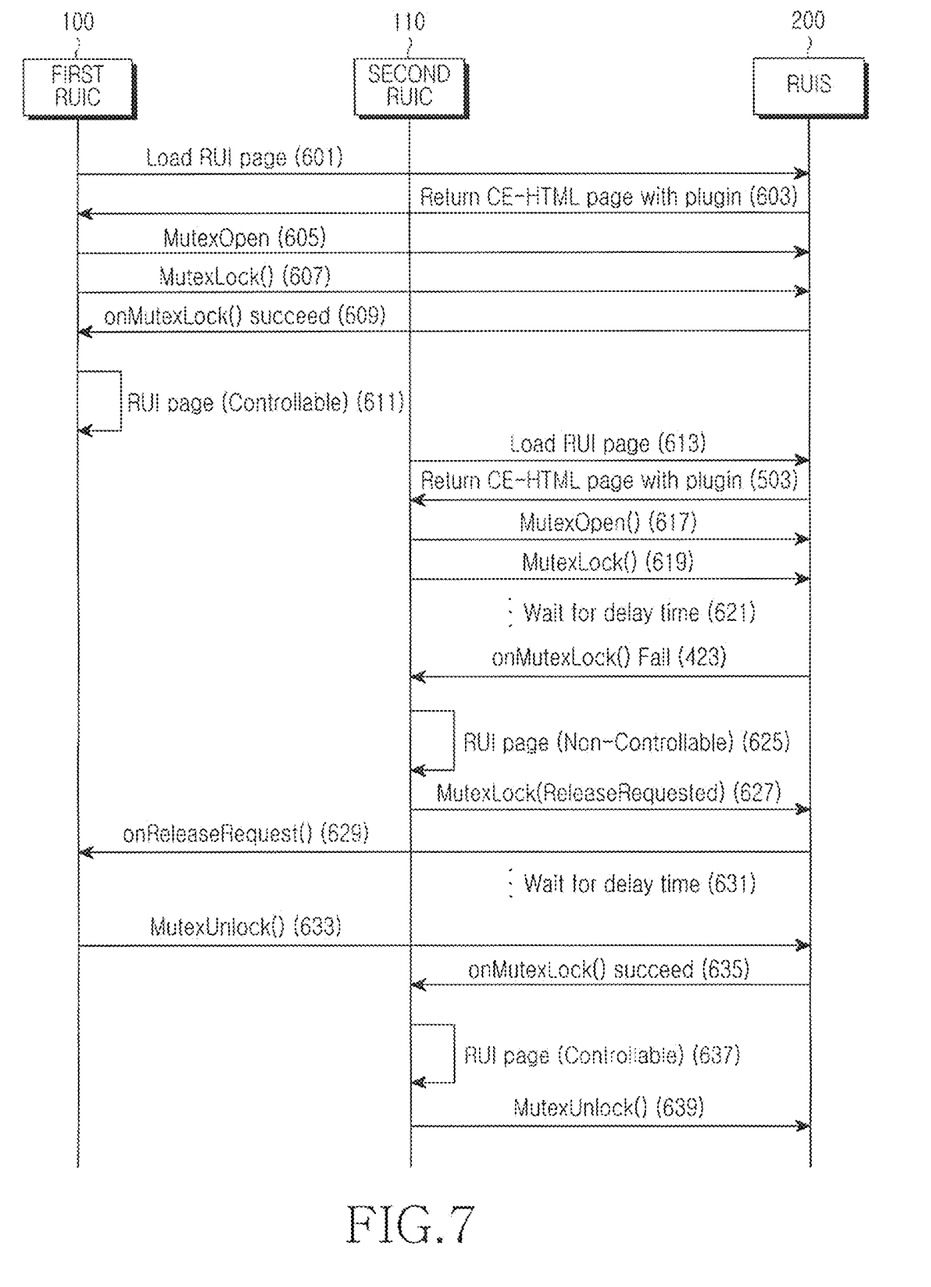
FIG. 7 illustrates an operation process of an RUI server and an RUI client according to a second embodiment of the present invention.

FIGS. 6 and 7 illustrate processes in which RUI clients and an RUI server operate using the control ownership plug-in object of Table 1 according to first and second embodiments of the present invention, respectively.

FIG. 6 illustrates a scenario in which when the second RUI client 110 requests access to a resource A of the first RUE server 200 after the first RUI client 100 first occupies the resource A, the first RUI client 100 releases the access to the resource A within a response wait time according to the present invention.

Referring to FIG. 6, the first RUI client 100 sends a request for an RUI page to the first RUI server 200 in step 501. In response to the RUI page request, the first RUI server 200 composes a CE-HTML page or an RUI page containing a control ownership plug-in object, and delivers or returns it to the first RUI client 100 in step 503. Upon receiving the RUI page, the first RUI client 100 invokes MutexOpen( ) for the resource A to the first RUI server 200 and generates (or sets) a connection to a MUTEX of the resource A that is described in MutexURL, in step 505. Thereafter, in step 507, the first RUI client 100 invokes MutexLock( ) to the first RUI server 200, and requests locking the MUTEX of the resource A to prevent access to the resource A by another RUI client. The locking request for MUTEX corresponds to an access restriction request to the resource A. This indicates exclusive access to the resource A of an application that the MUTEX designates.

If execution of MutexLock( ) is completed, the first RUI server 200 invokes a callback function onMutexLock( ) as 'succeed' and delivers it to the first RUI client 100 in step 509.

If the callback function onMutexLock( ) is invoked as 'succeed', the first RUI client 100 loads an RUI page capable of controlling the resource A, in step 511.

In step 513, the second RUI client 110 sends the first RUI server 200 a request for the same RUI page as the RUI page that the first RUI client 100 is using.

In step 515, the first RUI server 200 delivers or returns a CE-HTML page or an RUI page containing a control ownership plug-in object, to the second RUI client 110.

Upon receiving the RUI page, the second RUI client 110 invokes MutexOpen( ) for the resource A to the first RUI server 200 and generates a connection to a MUTEX of the resource A that is described in MutexURL, in step 517. In step 519, the second RUI client 110 requests locking access to the MUTEX of the resource A by invoking MutexLock( ) to the first RUI server 200. However, since access to the MUTEX in the first RUI server 200 is locked by the first RUI client 100, the second RUI client 110 waits, in step 521, for the request to be accepted for the response wait time that it delivered as a parameter during invocation of MutexLock( ).

If the first RUI client 100 closes the access to the resource A while the second RUI client 110 is waiting, the first RUI client 100 requests unlocking the MUTEX by invoking MutexUnlock( ) in step 523. Accordingly, the MutexLock( ) request by the second RUI client 110 may be completed, and then the first RUI server 200 invokes a callback function onMutexLock( ) as 'succeed' and delivers it to the second RUI client HO in step 525. If the locking of access to the MUTEX by the second RUI client 110 is not completed for the designated response wait time, the callback function onMutexLock( ) is invoked as 'fail'.

Upon acquiring the callback function onMutexLock( ) invoked as 'succeed', the second RUI client 110 loads an RUI page capable of controlling the resource A in step 527. If onMutexLock( ) is failed, an RUI page incapable of controlling the resource A is loaded.

After completing the access to the resource A, the second RUI client 110 unlocks the MUTEX of the resource A by invoking MutexUnlock( ) from the first RUI server 200 in step 529.

FIG. 7 illustrates an operation process for the first RUI client 100, the second RUI client 110 and the first RUI server 200 in the following state according to a second embodiment of the present invention. In FIG. 7, when the second RUI client 110 requests access to the resource A of the first RUI server 200 after the first RUI client 100 first occupies the resource A, the first RUI client 100 does not release the access to the resource A within a response wait time. Thus, the second RUI client 110 withdraws the access to the resource A from the first RUI client 100. Steps 601 to 621 in FIG. 7 are the same as steps 501 to 521 in FIG. 6.

Referring to FIG. 7, although the second RUI client 110 requests MUTEX locking to access the resource A in step 619, because resource A is being occupied by the first RUI client 100 and the first RUI client 100 does not end the occupation of the resource A for the response wait time in step 621, the callback function onMutexLock( ) is invoked as 'fail' in step 623.

In step 625, the second RUI client 110 loads an RUI page incapable of controlling the resource A. In step 627, the second RUI client 110 makes an access restriction release request for the resource A by including a parameter ReleaseRequested in MutexLock( ) and again requesting MUTEX unlocking.

The first RUI server 200 requests releasing access restriction to the resource A by invoking a callback function onReleaseRequest( ) to the first RUI client 100 in step 629, and waits for a response wait time in step 631.

Upon receipt of the access restriction release request, the first RUI client 100 invokes MutexUnlock( ) in step 633, if it intends to release access restriction to the resource A. When the first RUI client 100 denies releasing the access restriction to the resource A, the second RUI client 110 nay not acquire the access right.

If the access right is returned from the first RUI client 100 in step 633, a callback function onMutexLock( ) is successfully invoked to the second RUI client 110 in step 635, so that the second RUI client 110 acquires the access right to the resource A. Therefore, in step 637, the second RUI client 110 loads an RUI page capable of controlling the resource A. After completing the access to the resource A, the second RUI client 110 unlocks the MUTEX of the resource A by invoking MutexUnlock( ) from the first RUI server 200 in step 639.

As is apparent from the foregoing description, the present invention can control attempts that several RUI clients make to access resources of an RUI server, and can provide an RUI to an RUI client that accesses a resource which is being occupied by another RUI client, thereby facilitating a smooth remote control.

While the invention has been shown and described with reference to a certain exemplary embodiments thereof, it will be understood by those skilled in the art that various changes in form and details may be made therein without departing from the spirit and scope of the invention as defined by the appended claims and their equivalents. For example, the response wait time may be determined systematically, by each RUI client, or separately for each RUI client. The electronic device supporting the RUI service may operate as an RUI server or an RUI client according to its characteristic and role. Although not illustrated in the drawings, the RUI client and the RUI server each include a communication module capable of transmitting and receiving signals and data.

What is claimed is:

1. A method for controlling access to a mutual exclusion (MUTEX) resource by a remote user interface (RUI) client, comprising:
    sending a request for an RUI page to an RUI server;
    receiving the RUI page comprising a control ownership object associated with the MUTEX resource, from the RUI server;
    establishing a connection to the MUTEX resource of the RUI server based on the control ownership object;
    invoking a request for a MUTEX lock for causing the RUI server to restrict access to the MUTEX resource by another RUI client based on the control ownership object;
    sending a request for releasing access restriction to the MUTEX resource to the RUI server, upon receiving an inaccessibility to the MUTEX resource from the RUI server as the MUTEX resource is being used by another RUI client;
    waiting for acceptance of the request; and
    providing the RUI page for controlling the MUTEX resource to the user, upon receiving a success in releasing the access restriction to the MUTEX resource.

2. The method of claim 1, further comprising, receiving information indicating the MUTEX resource is successfully locked by the RUI server; and
    loading the received RUI page based on the received information.

3. The method of claim 1, further comprising sending a request for releasing the MUTEX lock for the MUTEX resource to the RUI server if use of the MUTEX resource is completed.

4. The method of claim 1, further comprising waiting for a delay time duration after sending the request for MUTEX lock if it is identified that another RUI client is using the MUTEX resource.

5. The method of claim 1, further comprising providing an RUI page incapable of controlling the MUTEX resource to a user upon receiving an inaccessibility to the MUTEX resource from the RUI server.

6. The method of claim 1, wherein the control ownership object comprising information on the MUTEX indicates an occupation status for the MUTEX resource corresponding thereto.

7. A non-transitory computer readable medium containing program instructions executable by a computer device to perform a method for controlling access to a mutual exclusion (MUTEX) resource by a remote user interface (RUI) client, the computer readable medium comprising:
    sending a request for an RUI page to an RUI server;
    receiving the RUI page comprising a control ownership object associated with the MUTEX resource, from the RUI server;
    establishing a connection to the MUTEX resource of the RUI server based on the control ownership object;
    invoking a request for a MUTEX lock for causing the RUI server to restrict access to the MUTEX resource by another RUI client based on the control ownership object;
    sending a request for releasing access restriction to the MUTEX resource to the RUI server, upon receiving an inaccessibility to the MUTEX resource from the RUI server as the MUTEX resource is being used by another RUI client;
    waiting for acceptance of the request; and
    providing the RUI page for controlling the MUTEX resource to the user, upon receiving a success in releasing the access restriction to the MUTEX resource.

8. The non-transitory computer readable medium of claim 7, further comprising:
    receiving information indicating that the MUTEX resource is successfully locked by the RUI server; and
    loading the received RUI page based on the received information.

9. The non-transitory computer readable medium of claim 7, further comprising:
    sending a request for releasing the MUTEX lock for the MUTEX resource to the RUI server, if use of the MUTEX resource is completed.

10. The non-transitory computer readable medium of claim 7, further comprising:
    waiting for a delay time duration after sending the request for MUTEX lock, if it is identified that another RUI client is using the MUTEX resource.

11. The non-transitory computer readable medium of claim 7, further comprising:
    providing an RUI page incapable of controlling the MUTEX resource to a user upon receiving an indication of inaccessibility to the MUTEX resource from the RUI server.

12. The non-transitory computer readable medium of claim 7, wherein the control ownership object comprising information on the MUTEX indicates an occupation status for the MUTEX resource corresponding thereto.

13. A remote user interface (RUI) client for controlling access to a mutual exclusion (MUTEX) resource, the RUI client comprising:
    a transceiver; and
    a processor configured to:
        send a request for an RUI page to an RUI server;
        receive the RUI page comprising a control ownership object associated with the MUTEX resource, from the RUI server;

establish a connection to the MUTEX resource of the RUI server based on the control ownership object;

invoke a request for a MUTEX lock for causing the RUI server to restrict access to the MUTEX resource by another RUI client based on the control ownership object;

send a request for releasing access restriction to the MUTEX resource to the RUI server, upon receiving an inaccessibility to the MUTEX resource from the RUI server as the MUTEX resource is being used by another RUI client;

wait for acceptance of the request; and provide the RUI page for controlling the MUTEX resource to the user, upon receiving a success in releasing the access restriction to the MUTEX resource.

14. The RUI client of claim 13, wherein the processor is further configured to:

receive information indicating the MUTEX resource is successfully locked by the RUI server; and load the received RUI page based on the received information.

15. The RUI client of claim 13, wherein the processor is further configured to send a request for releasing the MUTEX lock for the MUTEX resource to the RUI server if use of the MUTEX resource is completed.

16. The RUI client of claim 13, wherein the processor is further configured to wait for a delay time duration after sending the request for MUTEX lock if it is identified that another RUI client is using the MUTEX resource.

17. The RUI client of claim 13, wherein the processor is further configured to provide the RUI page incapable of controlling the MUTEX resource to a user upon receiving an inaccessibility of the MUTEX resource from the RUI server.

18. The RUI client of claim 13, wherein the control ownership object comprises information on the MUTEX indicates an occupation status for the MUTEX resource corresponding thereto.

19. The RUI client of claim 14, wherein the processor is further configured to display the RUI based on the RUI page on the RUI client.

* * * * *